United States Patent
Dan et al.

(10) Patent No.: US 9,720,731 B2
(45) Date of Patent: Aug. 1, 2017

(54) METHODS AND APPARATUS FOR COORDINATING AND SELECTING PROTOCOLS FOR RESOURCES ACQUISITION FROM MULTIPLE RESOURCE MANAGERS

(75) Inventors: Asit Dan, Pleasantville, NY (US);
Henner Gimpel, Karlsruhe (DE);
Heiko Ludwig, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 2160 days.

(21) Appl. No.: 12/136,215

(22) Filed: Jun. 10, 2008

(65) Prior Publication Data

US 2008/0243579 A1     Oct. 2, 2008

Related U.S. Application Data

(63) Continuation of application No. 11/335,126, filed on Jan. 19, 2006, now abandoned.

(51) Int. Cl.
*G06Q 10/00*     (2012.01)
*G06F 9/50*      (2006.01)
(Continued)

(52) U.S. Cl.
CPC .............. *G06F 9/50* (2013.01); *G06Q 10/06* (2013.01); *G06Q 10/0631* (2013.01);
(Continued)

(58) Field of Classification Search
CPC .............................. G06F 9/50; G06Q 10/0631
(Continued)

(56) References Cited

U.S. PATENT DOCUMENTS 5,799,289 A * 8/1998 Fukushima et al. .......... 705/400
5,946,662 A * 8/1999 Ettl et al. ......................... 705/8
(Continued)

FOREIGN PATENT DOCUMENTS

WO     WO02086715      10/2002
WO       2006035208     8/2007

OTHER PUBLICATIONS

Czajkowski, Karl, Ian Foster, Carl Kesselman, Volker Sander, and Steven Tuecke. "SNAP: A protocol for negotiating service level agreements and coordinating resource management in distributed systems." In Workshop on Job Scheduling Strategies for Parallel Processing, pp. 153-183. Springer, Berlin, Heidelberg, 2002.*

(Continued)

*Primary Examiner* — Beth V Boswell
*Assistant Examiner* — Mehmet Yesildag
(74) *Attorney, Agent, or Firm* — Louis J. Percello; Ryan, Mason & Lewis, LLP

(57) ABSTRACT

Techniques are disclosed for allocation of resources under the control of resource managers and the choice and coordination of resource acquisition protocols to communicate with these resource managers. The resource managers may be distributed and heterogeneous. For example, a technique for use by a service provider for allocating one or more resources from multiple resources associated with multiple resource managers based on at least one service agreement offer from a service client comprises the following steps/operations. At least one service agreement offer is obtained. A resource allocation is automatically determined based on the obtained service agreement offer. The automated step/operation of determining the resource allocation comprises: (i) coordinating selection of a resource acquisition protocol from among multiple resource acquisition protocols for use in communicating with the multiple resource managers to (Continued)

acquire one or more resources associated therewith; and (ii) evaluating a performance associated with one or more of the multiple resource acquisition protocols.

20 Claims, 6 Drawing Sheets

(51) Int. Cl.
| | |
|---|---|
| *G06Q 10/06* | (2012.01) |
| *H04L 12/54* | (2013.01) |
| *H04L 12/911* | (2013.01) |
| *H04L 29/06* | (2006.01) |
| *H04L 29/08* | (2006.01) |

(52) U.S. Cl.
CPC ... *G06Q 10/0639* (2013.01); *G06Q 10/06393* (2013.01); *H04L 12/5695* (2013.01); *H04L 47/748* (2013.01); *H04L 47/781* (2013.01); *H04L 67/1002* (2013.01); *H04L 67/1023* (2013.01); *H04L 67/322* (2013.01); *H04L 69/02* (2013.01); *H04L 67/16* (2013.01)

(58) Field of Classification Search
USPC ........................................................ 705/7.12
See application file for complete search history.

(56) References Cited

U.S. PATENT DOCUMENTS

| | | | |
|---|---|---|---|
| 6,085,215 A | 7/2000 | Ramakrishnan et al. | |
| 6,148,290 A | 11/2000 | Dan et al. | |
| 6,151,582 A | 11/2000 | Huang et al. | |
| 6,487,183 B1 | 11/2002 | Lo et al. | |
| 6,671,673 B1* | 12/2003 | Baseman et al. | 705/7 |
| 6,714,987 B1 | 3/2004 | Amin et al. | |
| 6,721,795 B1 | 4/2004 | Eldreth | |
| 7,035,816 B2* | 4/2006 | Jankelewitz | 705/26 |
| 2002/0156695 A1* | 10/2002 | Edwards | 705/26 |
| 2003/0046212 A1* | 3/2003 | Hunter et al. | 705/36 |
| 2003/0154123 A1* | 8/2003 | Subbloie et al. | 705/11 |
| 2003/0195759 A1 | 10/2003 | Glassco et al. | |
| 2004/0068431 A1* | 4/2004 | Smith et al. | 705/10 |
| 2004/0107110 A1* | 6/2004 | Gottlieb et al. | 705/1 |
| 2005/0144046 A1* | 6/2005 | Schloss | 705/4 |
| 2005/0243871 A1 | 11/2005 | Tanimoto | |
| 2006/0064409 A1* | 3/2006 | Hardwick | 707/3 |
| 2007/0226121 A1* | 9/2007 | Xue et al. | 705/37 |

OTHER PUBLICATIONS

U.S. Appl. No. 11/155,218, filed Jun. 16, 2005, A. Dan et al., "Methods and Apparatus for Agreement-Based Automated Service Provisioning".
A. Andrieux et al., "Web Services Agreement Specification (WS-Agreement)," Version 1.1, Draft 18, pp. 1-47, May 14, 2004.
A. Dan et al., "Connecting Client Objectives with Resource Capabilities: An Essential Component for Grid Service Management Infrastructures," ICSOC04, pp. 1-8.
H. Ludwig et al., "Cremona: An Architecture and Library for Creation and Monitoring of WS-Agreements," 10 pages.
A. Andrieux et al., "Web Services Agreement Specification (WS-Agreement)," https://forge.gridforum.org/projects/graap-wg/document/WS-AgreementSpecification/en/7, pp. 1-62, Jun. 28, 2005.
J.E. Murphy, "Resource Allocation with Interlock Election in a Multi-Task System," Fall Joint Computer Conference, pp. 1169-1176, 1968.
Search Report for EP 06803288 dated Aug. 13, 2009.

\* cited by examiner

FIG. 6

DATABASE ON THE PERFORMANCE CRITERIA OF RESOURCE ACQUISITION PROTOCOLS FOR DIFFERENT RESOURCE COMPONENTS

| $t(r, p)$ | PROTOCOL 1 | PROTOCOL 2 | PROTOCOL 3 | ... |
|---|---|---|---|---|
| RESOURCE TYPE 1 | $t(r_1, p_1)$ | $t(r_1, p_2)$ | $t(r_1, p_3)$ | ... |
| RESOURCE TYPE 2 | $t(r_2, p_1)$ | $t(r_2, p_2)$ | $t(r_2, p_3)$ | ... |
| ⋮ | ⋮ | | | ⋱ |

— 610a

| $d_1(r, p)$ | PROTOCOL 1 | PROTOCOL 2 | PROTOCOL 3 | ... |
|---|---|---|---|---|
| RESOURCE TYPE 1 | $d_1(r_1, p_1)$ | $d_1(r_1, p_2)$ | $d_1(r_1, p_3)$ | ... |
| RESOURCE TYPE 2 | $d_1(r_2, p_1)$ | $d_1(r_2, p_2)$ | $d_1(r_2, p_3)$ | ... |
| ⋮ | ⋮ | | | ⋱ |

— 610b

⋮

| $d_n(r, p)$ | PROTOCOL 1 | PROTOCOL 2 | PROTOCOL 3 | ... |
|---|---|---|---|---|
| RESOURCE TYPE 1 | $d_n(r_1, p_1)$ | $d_n(r_1, p_2)$ | $d_n(r_1, p_3)$ | ... |
| RESOURCE TYPE 2 | $d_n(r_2, p_1)$ | $d_n(r_2, p_2)$ | $d_n(r_2, p_3)$ | ... |
| ⋮ | ⋮ | | | ⋱ |

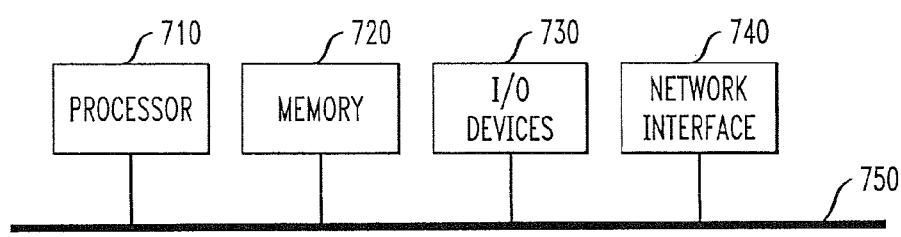

METHODS AND APPARATUS FOR COORDINATING AND SELECTING PROTOCOLS FOR RESOURCES ACQUISITION FROM MULTIPLE RESOURCE MANAGERS

CROSS REFERENCE TO RELATED APPLICATIONS

This application is a continuation of pending U.S. application Ser. No. 11/335,126 filed on Jan. 19, 2006, the disclosure of which is incorporated herein by reference.

FIELD OF THE INVENTION

This present invention generally relates to service environments and, more particularly, to the allocation of resources under the control of distributed heterogeneous resource managers and the choice and coordination of resource acquisition protocols to communicate with these resource managers.

BACKGROUND OF THE INVENTION

Consider a scenario where two or more parties set up a service relationship or they are already committed to a mutual specification of a service and start provisioning. The specification can be any service contract (see, e.g., U.S. Pat. No. 6,148,290 to Dan et al.) and can, for example, use the WS-Agreement language (see, e.g., A. Andrieux et al., "Web Services Agreement Specification," version 1.1, draft 18, May 2004, and H. Ludwig et al., "Cremona: An Architecture and Library for Creation and Monitoring of WS-Agreements," Proceedings of the $2^{nd}$ International Conference on Service Oriented Computing (ICSOC 2004), pp. 65-74, ACM Press, New York, 2004). The service can be specified on very different levels such as the application level giving quality of service requirements, the abstract resource level, or the detailed resource level (A. Dan et al., "Connecting Client Objectives with Resource Capabilities: An Essential Component for Grid Service Management Infrastructures," Proceedings of the $2^{nd}$ International Conference on Service Oriented Computing (ICSOC 2004), pp. 57-64, ACM Press, New York, 2004).

For some parties, the service relationship will require utilizing resources which are to be obtained from resource managers. Without loss of generality, every party required to utilize resources to a service relationship is called a service provider. In a service relationship, there is at least one service provider (provider for short).

No matter at which level of abstraction a service agreement is specified, a provider will have a provisioning description detailing the resource types and quantities needed to provide the service and outlining the assembly of these resource types. The provider then faces the decision how to approach the acquisition of the necessary resources from distributed resource managers that belong either to the service provider himself, or to other organizations. The acquisition process will oftentimes be time constrained and costly. Thus, the problem presented to such a provider is as follows: the acquisition of resources from distributed resource managers with potential time constraints and trade-offs between different performance criteria for resource acquisition protocols.

A plethora of resource acquisition protocols has been proposed and implemented in countless applications. Examples for protocols range from random allocation over round robin techniques and distributed search algorithms and heuristics to market-based approaches like posted price systems, auction mechanisms, and negotiation protocols.

These protocols are tailored to a specific scenario and/or a specific domain. Some of them explicitly try to maximize performance of resource allocation with respect to one or the other criterion. However, all of these protocols have different characteristics with respect to different performance criteria such as, for example, time consumption, communication costs, and opportunity costs from not finding the optimal allocation. There is no overall best protocol to choose for a resource provider with heterogeneous service requests and diverse time constraints. The relative importance of criteria as well as the protocols' performance with respect to the criteria varies with varying requests. The choice of a single protocol thus depends on the specific service request. This choice of resource acquisition protocols is a problem that is neither addressed nor solved by existing approaches.

Furthermore, brokering approaches are used to assign individual requests to a processing node. However, such an approach presumes that the relevant resources have been acquired before (and primarily a choice is made) and that the brokering mechanism is, hitherto, static.

SUMMARY OF THE INVENTION

The present invention provides techniques for allocation of resources under the control of resource managers and the choice and coordination of resource acquisition protocols to communicate with these resource managers. The resource managers may be distributed and heterogeneous.

For example, in one aspect of the invention, a technique for use by a service provider for allocating one or more resources from multiple resources associated with multiple resource managers based on at least one service agreement offer from a service client comprises the following steps/operations. At least one service agreement offer is obtained. A resource allocation is automatically determined based on the obtained service agreement offer. The automated step/operation of determining the resource allocation comprises: (i) coordinating selection of a resource acquisition protocol from among multiple resource acquisition protocols for use in communicating with the multiple resource managers to acquire one or more resources associated therewith; and (ii) evaluating a performance associated with one or more of the multiple resource acquisition protocols.

The coordination step/operation may further comprise traversing a provisioning description. Traversal of the provisioning description may comprise identifying types and quantities of resources to be acquired. Coordination may comprise selecting resource acquisition protocols based on performance criteria. Further, coordination may comprise carrying out at least one resource acquisition protocol and acquiring one or more resources. The step/operation may also comprise updating the protocol performance evaluation step based on an observed performance of at least one resource acquisition protocol. Still further, the coordination step/operation may carry out a protocol and, upon completion of the protocol, determine whether another protocol will be executed to either find an allocation or to improve an allocation that was already found. The step/operation may terminate either when it is not possible to find any allocation, or when an allocation is found which cannot be expected to be improved.

The protocol performance evaluation step/operation may further comprise capturing a realized performance of at least one resource acquisition protocol with respect to different criteria and resource types. The step/operation may also evaluate an expected performance of at least one resource acquisition protocol with respect to different criteria and resource types. It may further comprise deriving results based on input from the coordination step and/or a database containing historic information.

In another aspect of the invention, a technique for use in automatically managing an allocation of one or more resources comprises obtaining a service request, and acquiring resources from distributed resource managers by dynamically choosing at least one acquisition protocol, from multiple acquisition protocols, suitable for substantially satisfying the service request. Suitability of a protocol may be based on a trade-off associated with multiple objectives. The multiple objectives may comprise a time requirement associated with the request, a direct cost associated with the request, and an indirect cost associated with the request.

In yet another aspect of the invention, a technique for use by a service provider for allocating one or more resources from multiple resources associated with multiple resource managers comprises obtaining at least one service agreement offer from a service client. Based on the service agreement offer, a set of resource managers offering a given resource type is identified. One or more resource allocation protocols are selected based on respective performances of the one or more resource allocation protocols for the given resource type. The technique then coordinates execution of the one or more resource allocation protocols to yield an optimal allocation. The technique may further comprise identifying an alternative set of resource types to fulfill the service agreement offer, selecting one or more resource allocation protocols based on respective performances of the one or more resource allocation protocols for a given alternative resource type, and coordinating execution of the one or more resource allocation protocols to yield an optimal alternative allocation.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 6 depicts a protocol performance database potentially being used by the algorithm outlined in FIG. 5, according to an embodiment of the present invention.

FIG. 7 is a diagram illustrating a computing system in accordance with which one or more components/steps of a resource acquisition system may be implemented, according to an embodiment of the present invention.

DETAILED DESCRIPTION OF PREFERRED EMBODIMENTS

Figure 1:
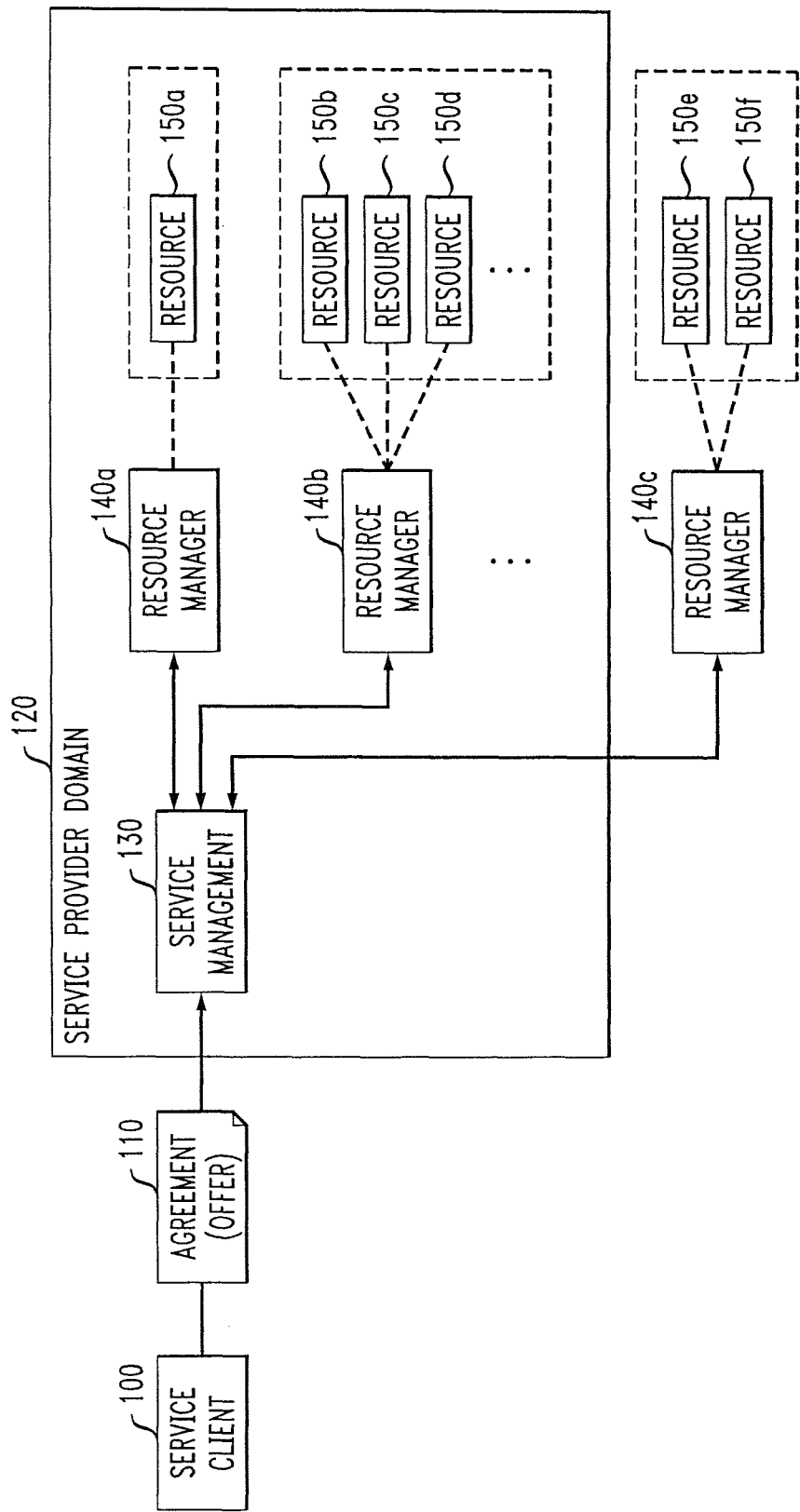
FIG. 1 shows components and interactions of a system in which a service client approaches a service provider with either an agreement or an agreement offer and the service provider acquires resources from resource managers for service provisioning, according to an embodiment of the present invention.

The present invention will be explained below in the context of an illustrative information technology (IT) service environment. However, it is to be understood that the present invention is not limited to such a service environment. Rather, the invention is more generally applicable to any service environment in which it would be desirable to provide improved resource acquisition.

Accordingly, as will be explained herein, illustrative principles of the invention provide for acquisition of IT resources to fulfill a service agreement. It is to be understood that the term "automated" and the term "automatically" generally describe steps or operations that are not performed manually (e.g., by a human operator) but rather are performed via one or more processing systems or devices (e.g., by a computer system).

As will be illustratively explained herein, principles of the present invention facilitate the acquisition of resources from multiple resource managers in two ways: (1) a coordination process selects resource acquisition protocols and coordinates the acquisition of resources, itself; and (2) a protocol performance information service provides information on the context-dependent expected performance of a protocol.

The coordination process is part of a service provider's service management component. It takes a list of resources required for provisioning a service, i.e., a provisioning description, as input. The process then locates resource managers that could potentially supply the resources. Furthermore, for each resource to be acquired, the process decides on a combination of resource managers to contact and an acquisition protocol to use. The protocol is carried out and, upon completion of the protocol, the process determines whether another protocol will be executed to either find an allocation or to improve an allocation that was already found. The process terminates either when it is impossible to find any allocation, or when an allocation is found which cannot be expected to be improved with reasonable effort.

The protocol performance information service offers an evaluation of the expected performance of acquisition protocols depending on the resources to be acquired and the resource managers to be contacted. The performance of a protocol can be specified along domain-dependent criteria. In service oriented computing, at least the following three dimensions can be vital: time spend to carry out the protocol, direct costs arising from the protocol (e.g., communication costs), and indirect costs arising from the protocol (e.g., opportunity costs from finding a sub-optimal allocation). Additional criteria are possible. The protocol performance information service can derive its estimate of a protocol's expected performance either from an algorithm, or from a database containing historic information.

Thus, two key components of the invention are: (1) the coordination process; and (2) the protocol performance information service. Illustrative features of the coordination process are as follows:
 1. ability to traverse a provisioning description;
 2. ability to select protocols based on performance criteria;
 3. ability to carry out protocols and acquire resources; and 4. ability to update the protocol performance information service based on the observed performance of protocols.

Illustrative features of the protocol performance information service are as follows:
1. ability to capture the realized performance of resource acquisition protocols with respect to different criteria and resource types; and
2. ability to evaluate the expected performance of protocols with respect to different criteria and resource types.

Acquiring resources via principles of the present invention can be applied in many situations. Examples of such situations are: (1) determining a tentative resource allocation while defining a service agreement with a business partner (e.g., by negotiation); (2) setting up service provisioning after an agreement has been reached; (3) re-allocating resources during service provisioning, and (4) combinations thereof.

Principles of the present invention are capable of acquiring resources from distributed resource managers by dynamically choosing acquisition protocols most suitable for the request at hand. The suitability depends on trading-off several objectives such as, for example, time requirements, direct costs, and indirect costs. In any environment where there is not one single acquisition protocol that is best on all objectives (for example, because the environment is constantly changing and the requests are heterogeneous with respect to the required resource types and the timeliness of the handling), the performance of the proposed mechanism has the potential to exceed the performance of any system employing a single resource acquisition protocol.

It is understood that service provisioning requires utilizing resources. Thus, a service provider will have a plan as to which resource types, quantities, interconnections, and potentially different assemblies to use for provisioning a service agreement. Such a plan is called a provisioning description. One example of a provisioning description is the provisioning description disclosed in the U.S. patent application identified as Ser. No. 11/155,218, filed on Jun. 16, 2005, and entitled "Methods and Apparatus for Agreement-Based Automated Service Provisioning," the disclosure of which is incorporated by reference herein. One purpose of employing principles of the present invention can be estimating the costs of provisioning before committing to an agreement. Another application area is acquiring resources and deploying a service after a service agreement is fixed. In any case, a desired outcome of illustrative methods of the invention is the selection of one out of possibly several resource assemblies as well as a list of resource managers from which the included resources were acquired. It is to be appreciated that resource assemblies are alternative sets of resources suitable to provide a service as specified.

To this end, a coordination process iterates over the different resource assemblies in the provisioning description. Each assembly includes references to resource types along with quantity requirements. For each of these resource types, the process obtains a list of resource managers that could potentially provision the desired resources. The resource managers can either be in the same organization, or across organizational boundaries. Furthermore, the process contacts the protocol performance information service for each resource type.

The protocol performance information service determines the expected performance of different acquisition protocols for a given resource type. The performance thereby is specified along one or more criteria such as, for example, time requirements and different types of costs. Determining the expected performance can either be done by computation, by simulation, or by looking the result up in a database that either contains static values, or a database that is regularly updated with the results of acquisition processes and therefore contains historic information on the performance of different protocols. The protocol performance information service returns a characterization of all possible acquisition protocols along all performance criteria.

The coordination process then trades-off the different dimensions against each other and selects an acquisition protocol. This protocol is carried out, i.e., the resource provider uses it to communicate with resource managers and acquire resources. Upon completion of the protocol, the coordination process determines how to proceed: If another protocol offers the potential to improve the allocation (this involves finding an allocation at all, if the previous protocols failed), it is carried out. If on the other hand, a satisfying allocation has been found, the process continues with the next resource type. Finally, it can be the case that no allocation was found or the best allocation found so far is not satisfying and that no further protocol promises to improve the situation. In this case, the resource cannot be acquired and the process continues with the next resource assembly.

Each time an acquisition protocol is carried out, the protocol performance information service can be informed on the protocol's realized performance. This information can potentially be used to improve future performance estimates.

The coordination process stops iterating over resources within an assembly, once all resources have been acquired, or one of them cannot be acquired at reasonable conditions. Iterating over assemblies stops when either a satisfying one has been found or all assemblies were tried. In the latter case, either the best assembly is chosen or, if none of them is complete, the process failed to acquire the resources in a provisioning description.

During the iterations, the protocols might make tentative reservations of resources to guarantee their availability. Each time the process progresses to another assembly, it checks whether there are outstanding reservations for resources that are not included in the assemblies to be processed from then on and that are not part of a complete assembly that is kept as potentially best. If there are such reservations, they are cancelled as the resources will not be required at the end.

The coordination process terminates by either returning an allocation of resource requirements within a single resource assembly to resource managers or by returning the message that it failed to acquire any assembly.

FIG. 1 shows components and interactions of a system in which a service client 100 approaches a service provider 120 with either an agreement or an agreement offer 110. The service provider's service management 130 receives the agreement and derives a provisioning description. The provisioning description is a detailed list of resource types that can be used for provisioning the service requested in the agreement 110 as well as a list of assemblies of these resources that describes which quantity of resources has to be utilized, how resources are interrelated, and how they must be configured. This description is processed by a resource acquisition coordination process.

While not limited thereto, the provisioning description used by the invention may be implemented as disclosed in the above-referenced U.S. patent application identified as Ser. No. 11/155,218. By way of further example, the provisioning description can be implemented as an Extensible Markup Language (XML) file that can be parsed and processed by the resource acquisition process.

The resource acquisition process communicates with resource managers 140a, 140b, and 140c to acquire resources. These resource managers can either belong to the service provider (such as 140a and 140b) or to other organizations (such as 140c). Each resource manager has control over one or more resources 150a, 150b, 150c, 150d, 150e, and 150f.

Figure 2:
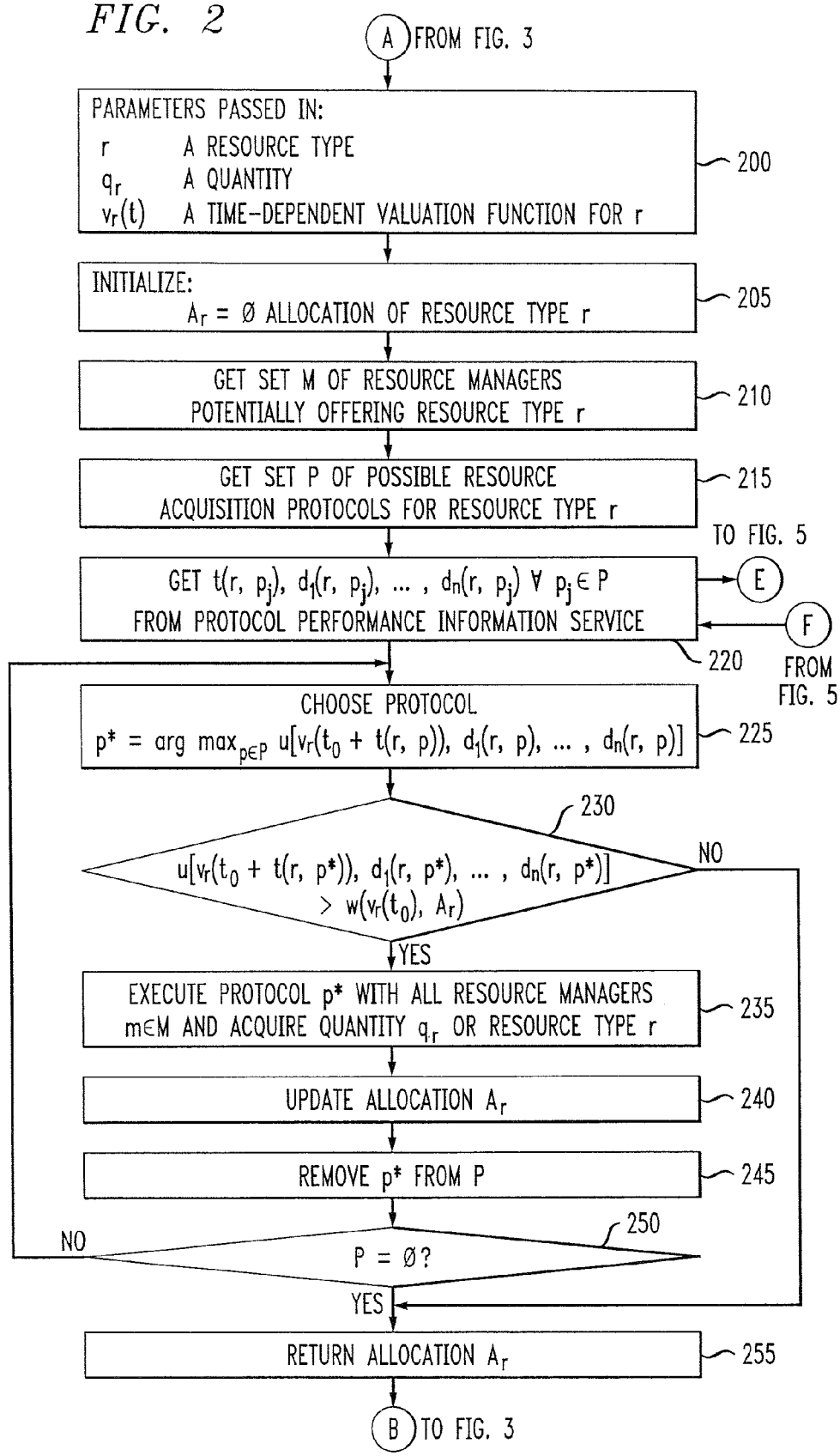
FIG. 2 outlines an algorithm executed by a provider's service management to acquire a single resource type, according to an embodiment of the present invention.

The basic process followed by the service management component 130 to acquire resources of a single type is outlined in FIG. 2. The more complex overall process of traversing the provisioning description will be detailed later on.

FIG. 2 outlines the resource acquisition process executed by the provider's service management component 130 to acquire resources of a single type. The parameters input to the process in step 200 are a description of the resource type r, the quantity $q_r$ required according to the provisioning description and a time-dependent valuation function $v_r(t)$ for resource type r and time t. The algorithm returns an allocation $A_r$; this is initialized as empty set in step 205.

The algorithm proceeds by determining the set M of resource managers 140a, 140b, and 140c that can potentially provision resource type r (step 210) and the set P of resource acquisition protocols that can be used to communicate with the resource managers on the availability of resources (step 215).

Next, the algorithm contacts the protocol performance information service and, for each protocol in the set P, it obtains information on the expected performance of the protocol in acquiring resources of type r (step 220). The performance is specified along several criteria. One criterion, denoted t(r, p) in FIG. 2, is the time required to execute a protocol. The other criteria are labeled $d_1(r, p)$, $d_2(r, p), \ldots, d_n(r, p)$, examples of which are communication costs as direct costs a protocol generates and opportunity costs that can arise from not finding the optimal allocation.

In step 225, the different performance measures are traded-off against each other and a single protocol p* out of the set P is chosen. The protocol is chosen in a way that it is the most promising of the available protocols. For this, a multi-attribute utility function, denoted as u, can be formulated and maximized. Various such functions are well known in the art, see, e.g., R. L. Keeney et al. "Decisions with Multiple Objectives: Preferences and Value Tradeoffs," Cambridge University Press, 1993. The time-dependent value function $v_r(t)$ enters as a prominent attribute in this utility function u. Acquiring resource type r, for example, can be worthless after a certain time t' as the client's request requires that service provisioning starts at t'. Thus, the value of the resource does not enter with its current value at time $t_0$, but with its value at the time the protocol is expected to be executed completely, i.e., at $t_0+t(r, p)$.

Note that utility maximization is one possible way of selecting a resource acquisition protocol in step 225. It is, however, not the only one. Any decision rule that selects a protocol based on the values of t(r, p) and $d_1(r, p)$, $d_2(r, p), \ldots, d_n(r, p)$ for each protocol or a subset thereof can be used. Besides utility maximization, this can, for example, be done by lexicographic ordering or policy-based.

Step 230 checks, whether p*, i.e., the best available protocol for the specific acquisition task, promises a result that is preferable to the current allocation. The first time step 230 is executed, the current allocation is the empty set, i.e., there is not yet an allocation. However, subsequently a situation might occur in which there already is an allocation of resource requirements to resource managers and the algorithm checks whether another protocol should be executed to potentially improve the allocation. In this case, the expected performance of the protocol is compared with the quality of the allocation that is already reached. The notation in FIG. 2 implies that the comparison is done in a utility-based manner. The utility of the present allocation at the present time is given by a function w and compared to the utility supposedly offered by executing p*. As for step 225, a utility-based computation is one solution. Others approaches are, for example, decision heuristics and policies. If the protocol does not satisfy the check, i.e., it does not appear promising, the algorithm proceeds with step 255 and returns the current allocation. The current allocation can either be the empty set, or an assignment of quantities of resource type r to resource managers within M. The overall quantity of resource type r that is acquired is at least qr.

If the result of step 230 is positive, the algorithm proceeds with step 235 and executes protocol p*. The service management component 130 thus communicates with the resource managers 140a, 140b, and 140c in the set M to acquire quantity $q_r$ of resource type r. The specific activities, messages, and decision rules in the communication are specified by the resource acquisition protocol p*. Such protocols are, for example, random allocation, round robin techniques, distributed search algorithms, posted price systems, auction mechanisms, and negotiation protocols.

In case of a successful resource acquisition, the allocation is updated in step 240. If the protocol failed, step 240 does not alter the current allocation. Step 245 removes the protocol p* from the set P of protocols. Thus, p* is not considered for acquiring resource type r any more, as it already has been executed.

Step 250 determines whether the search process ends or not. If no more protocols are available for execution, i.e., P is the empty set, the algorithm proceeds to step 255 and terminates by returning allocation $A_r$. Otherwise, the process goes back to step 225 and again chooses the best algorithm out of the now reduced set P. The iteration over protocols stops if either the best protocol does not offer a satisfying improvement of the current allocation (step 230), or there is no more protocol to execute (step 250).

Figure 3:
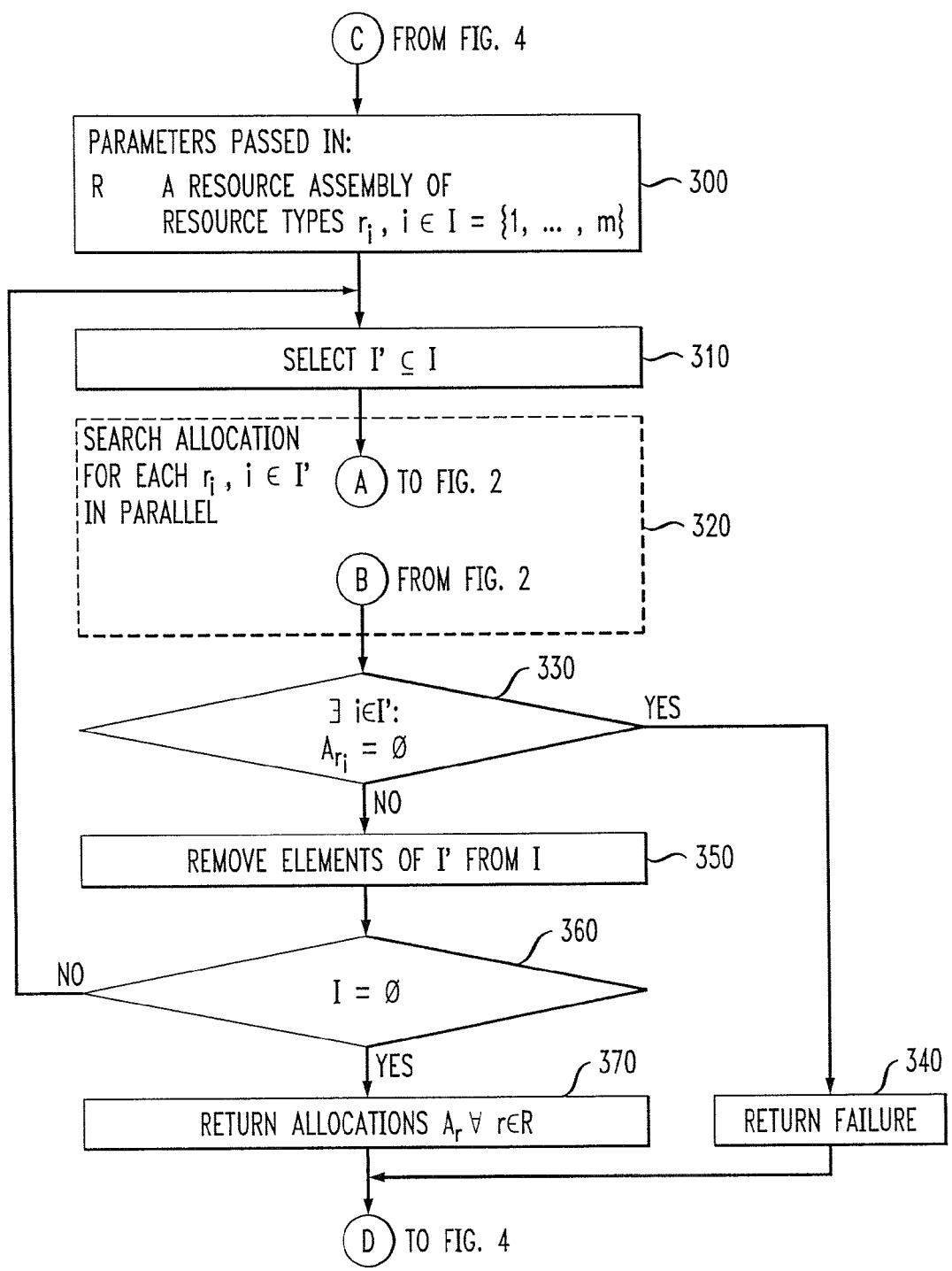
FIG. 3 embeds the algorithm depicted in FIG. 2 in an algorithm executed by a provider's service management to iterate over different resource types in a resource assembly, according to an embodiment of the present invention.

FIG. 3 embeds the algorithm depicted in FIG. 2 in an algorithm executed by a provider's service management to iterate over different resource types in a resource assembly. In step 300, the algorithm receives a resource assembly as a parameter. The resource assembly contains descriptions of m resource types $r_1, \ldots, r_m$ along with the required quantities and time-dependent valuation functions.

Step 310 selects a subset I' of indices from the index set I. This allows to either acquire all resources in parallel (I'=I), or one at a time (|I'|=1), or anything in between. Parallel processing will generally be more favorable if the acquisition protocols are time consuming, for example, due to long response times by the resource managers. Sequential processing on the other hand is more favorable if the acquisition of some of the resource types is likely to fail. Processing the failure-prone acquisition tasks first allows stopping the processing of an assembly early, if necessary.

Step 320 executes the algorithm outlined in FIG. 2. This is done for each resource type indicated by the index set I' in parallel. In case of successful acquisition, the result is an allocation of each resource type. Failure of an acquisition process results in an empty set. If any of the acquisition processes failed, step 330 directs the algorithm to step 340 and a failure notice is returned. If one of the acquisition tasks fails, the result of step 330 can be determined without awaiting the result of the other acquisition tasks. Thus, all resource acquisitions are stopped as soon as one fails.

If the resource acquisition protocols resulted in an allocation for each $r_i$ with i in the index set I', these indices are removed from the set I (step 350), as no additional resources have to be acquired for these types. If all resource types were processed (I=Ø; step 360), the algorithm terminates with step 370 by returning the allocation of each resource type in the assembly R. Otherwise, i.e., if not all resources have been acquired yet, the algorithm goes back to step 310 and selects a new subset of resource types to be selected next.

Figure 4:
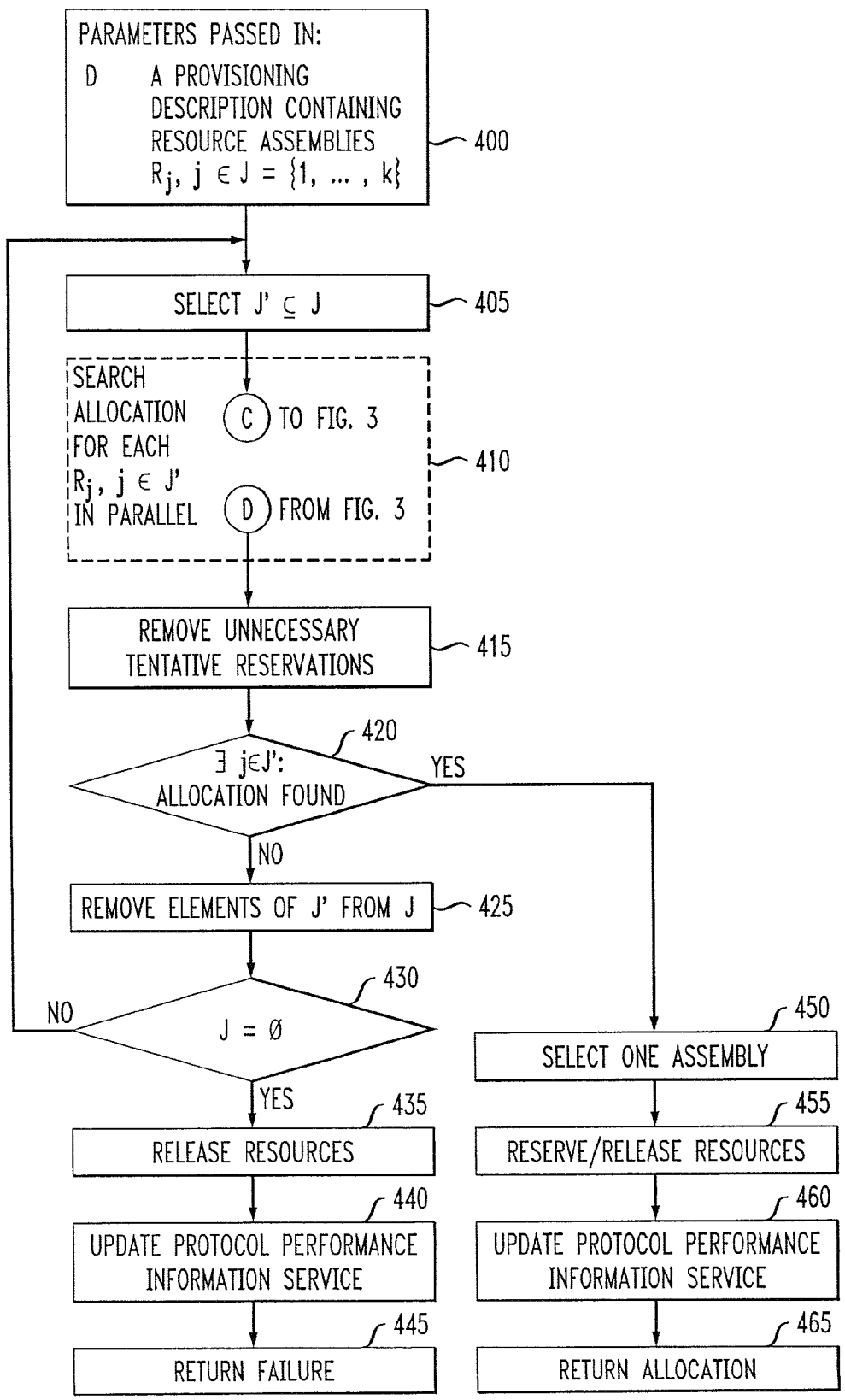
FIG. 4 embeds the algorithm depicted in FIG. 3 in an algorithm executed by a provider's service management to iterate over different resource assemblies in a provisioning description, according to an embodiment of the present invention.

FIG. 4 embeds the algorithm depicted in FIG. 3 in an algorithm executed by a provider's service management to iterate over different resource assemblies. The starting point is that the service management component 130 has the provisioning description and starts the process depicted in FIG. 4 with step 400. The provisioning description contains one or more resource assemblies $R_j$ with j in the index set J.

Step 405 selects a subset J' of the index set J to determine which assemblies are processed in parallel in step 410. For each of these, i.e., for $R_j$ with j in J', the algorithm depicted in FIG. 3 is processed in parallel. Thus, for each assembly under current consideration, the algorithm iterates over the contained resource types and tries to acquire the respective resources by selecting and then executing resource acquisition protocols.

Step 410 can result in resources being tentatively reserved by the executed acquisition protocols. If the acquisition of at least one resource type within an assembly failed, then all reservations for the assembly's other resource types are dissolved unless the respective resources are part of another assembly as well (step 415).

Next, it is checked whether an allocation was found for at least one resource assembly (step 420). If not, the algorithm proceeds by removing the indices of the processed assemblies from the index set J (step 425). Afterwards, the algorithm checks whether there are other resource assemblies to acquire (step 430). If so, the algorithm goes back to step 405. Otherwise, the algorithm ends by performing three steps: firstly, all tentative resource reservations that were made are released (step 435); secondly, the protocol performance information service is updated (step 440); thirdly, a failure notice is returned in step 445 because no resource assembly was acquired successfully.

If, on the other hand, the check in step 420 ends positively, i.e., all resources of at least one assembly were acquired successfully, the algorithm proceeds with selecting exactly one of the potentially several successful assemblies (step 450). Subsequently, resources reserved for any other assembly are released and the resources of the selected assembly are reserved, if necessary (step 455). Step 455 is related to step 435. The difference is that step 455 not only cancels reservations but can make additional resource reservations as well. Next, step 460 updates the protocol performance information service. This is analogous to step 440. With this, the algorithm terminates and reports the allocation to the service management (step 465).

Figure 5:
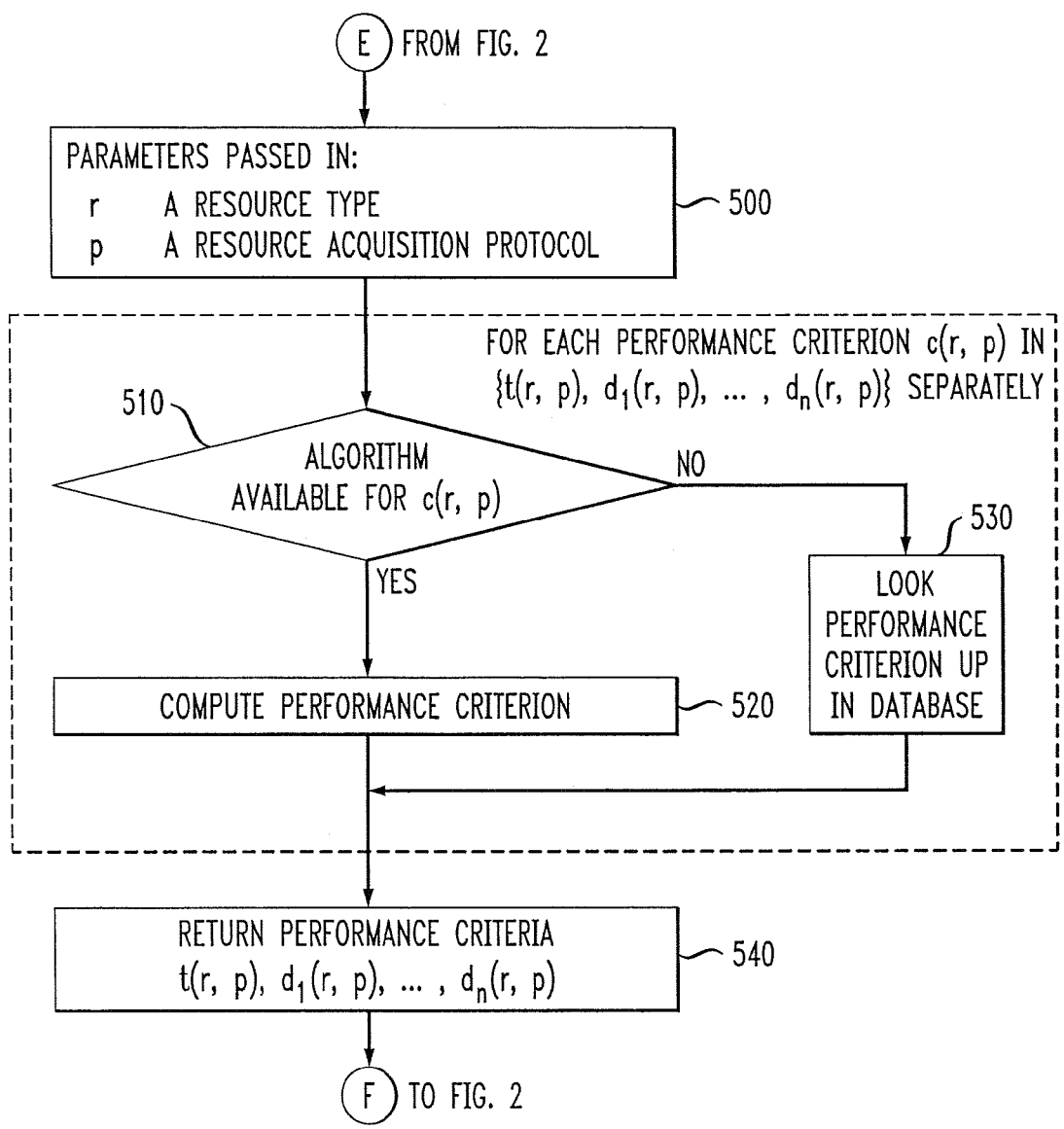
FIG. 5 outlines an algorithm for a protocol performance information service, according to an embodiment of the present invention.

FIG. 5 outlines an algorithm for the protocol performance information service. This algorithm is called by step 220 in the algorithm shown in FIG. 2. The parameters passed in are one resource type r and one resource acquisition protocol p (step 500). Obtaining the expected value for different criteria is done for each performance criterion separately. At first, step 510 checks whether there is an algorithm (i.e., a closed form function, a heuristic, or an estimation model) to compute the value for the one specific performance criterion with respect to the parameters r and p. If so, the computation is done in step 520. If the value cannot be computed, it is looked up in the protocol performance database (step 530). Finally, the set of all criteria is returned to the algorithm outlined in FIG. 2 (step 540).

FIG. 6 illustrates a protocol performance database potentially being used by the algorithm outlined in FIG. 5, specifically in step 530. The overall database 600 in this exemplified implementation contains one table for each performance criterion. Table 610a captures information on the protocols' time consumption for acquiring different resource types. Table 610b holds information on criterion $d_1$, for example, the communication costs generated by the respective protocol. Table 610c stores information on yet another criterion, for example, opportunity costs from not finding the optimal resource allocation.

FIG. 7 depicts a computing system in accordance with which one or more components/steps of a resource allocation system (e.g., components and methodologies described in the context of FIGS. 1 through 6) may be implemented, according to an embodiment of the present invention. It is to be understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computing system shown in FIG. 7 represents an illustrative computing system architecture for implementing, among other things, one or more functional components/steps of a resource allocation system, e.g., service management component 130, protocol performance database 600, etc., as may be maintained by a service provider. Further, the computing system architecture may also represent an implementation of one or more resource managers, and/or one or more of the actual resources provided by the service provider. Still further, the computing system architecture may also represent an implementation of one or more service clients.

As shown, the computing system architecture may comprise a processor 710, a memory 720, I/O devices 730, and a network interface 740, coupled via a computer bus 750 or alternate connection arrangement.

It is to be appreciated that the term "processor" as used herein is intended to include any processing device, such as, for example, one that includes a central processing unit (CPU) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Accordingly, as illustratively explained herein, principles of the invention provide techniques for providing one or more services utilizing resources. Oftentimes a service provider will have the choice which specific resources to allocate to a given service and has to decide on a resource allocation protocol to communicate with resource managers. Illustrative principles of the invention provide methods and apparatus for resource allocation with explicit consideration of time consumption, costs, and other performance criteria associated with resource acquisition protocols in a dynamically changing scenario with multiple heterogeneous resource managers.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
    deploying a service management platform on one or more computing nodes of a computer network, which is configured to acquire computing resources that are used for provisioning services;
    receiving, by the service management platform, an electronic document from a service client wherein the electronic document specifies a set of resources of different resource types for provisioning a requested service;
    servicing said received service client request by the service management platform to acquire the set of resources of different resource types for provisioning the requested service, wherein servicing said received service client request comprises performing an automated process which comprises:
        automatically processing the electronic document to identify the set of resources of different resource types for provisioning the requested service in the electronic document;
        automatically determining a plurality of resource managers offering resources corresponding to the different resource types to be utilized for provisioning the service requested in the electronic document; wherein the plurality of resource managers are distributed and heterogeneous;
        for each given resource type of the different resource types identified, automatically determining an optimal resource allocation protocol to be used for acquiring resources of said given resource type from the plurality of resource managers, wherein automatically determining the optical resource allocation protocol comprises:
            automatically selecting a set of one or more resource allocation protocols for communicating with the plurality of resource managers to allocate resources of the given resource type provided by the plurality of resource managers, wherein automatically selecting is based on respective performances of the one or more resource allocation protocols for the given resource type; and
            coordinating execution of each of the resource allocation protocols in the selected set of one or more resource allocation protocols to determine an optimal allocation of resources of the given resource type provided by the plurality of resource managers for provisioning the service;
            wherein at least one of the resource allocation protocols utilizes a different type of resource acquisition methodology from at least another of the resource allocation protocols, and
            utilizing the resource allocation protocol in the selected set of one or more resource allocation protocols, which is determined to provide the optimal allocation of resources of said given resource type, to acquire resources of said given resource type from the plurality of resource managers;
    wherein the method steps are implemented by a processor device executing program code.

2. The method of claim 1, wherein automatically processing the electronic document comprises automatically generating a provisioning description, and traversing the provisioning description to identifying types and quantities of resources to be acquired.

3. The method of claim 1, wherein coordinating the execution of each of the resource allocation protocols in the selected set of one or more resource allocation protocols to determine an optimal allocation of resources of the given resource type comprises identifying and executing at least one resource acquisition protocol that meets or exceeds specified performance criteria.

4. The method of claim 3, wherein the specified performance criteria comprise a time requirement associated with execution of a given resource allocation protocol and a cost of communication associated with the execution of the given resource allocation protocol.

5. The method of claim 3, wherein identifying and executing at least one resource acquisition protocol that meets or exceeds specified performance criteria comprises obtaining historical performance information associated with the at least one resource acquisition protocol from a database containing historic information.

6. The method of claim 1, wherein coordinating the execution of each of the resource allocation protocols in the selected set of one or more resource allocation protocols to determine an optimal allocation of resources of the given resource type comprises evaluating a performance of at least one of the selected resource acquisition protocols to determine if the performance of the at least one selected resource acquisition protocol meets or exceeds specified performance criteria.

7. The method of claim 6, wherein the performance is evaluated based on at least one of a protocol execution tine, a resource cost, a number of messages exchanged, and a total size of exchanged data.

8. An article of manufacture comprising a non-transitory computer readable storage medium comprising computer executable program code which, when executed by a computer, implements method steps comprising:

deploying a service management platform on one or more computing nodes of a computer network, which is configured to acquire computing resources that are used for provisioning services;

receiving, by the service management platform, an electronic document from a service client, wherein the electronic document specifies a set of resources of different resource types for provisioning a requested service;

servicing said received service client request by the service management platform to acquire the set of resources of different resource types for provisioning the requested service, wherein servicing said received service client request comprises performing an automated process which comprises:

automatically processing the electronic document to identify the set of resources of different resource types for provisioning the requested service in the electronic document;

automatically determining a plurality of resource managers offering resources corresponding to the different resource types to be utilized for provisioning the service requested in the electronic document;

wherein the plurality of resource managers are distributed and heterogeneous;

far each given resource type of the different resource types identified, automatically determining an optimal resource allocation protocol to be used for acquiring resources of said given resource type from the plurality of resource managers, wherein automatically determining the optical resource allocation protocol comprises:

automatically selecting a set of one or more resource allocation protocols for communicating with the plurality of resource managers to allocate resources of the given resource type provided by the plurality of resource managers, wherein automatically selecting is based on respective performances of the one or more resource allocation protocols for the given resource type; and coordinating execution of each of the resource allocation protocols in the selected set of one or more resource allocation protocols to determine an optimal allocation of resources of the given resource type provided by the plurality of resource managers for provisioning the service;

wherein at least one of the resource allocation protocols utilizes a different type of resource acquisition methodology from at least another of the resource allocation protocols, and utilizing the resource allocation protocol in the selected set of one or more resource allocation protocols, which is determined to provide the optimal allocation of resources of said given resource type, to acquire resources of said given resource type from the plurality of resource managers.

9. The article of manufacture of claim 8, wherein automatically processing the electronic document comprises automatically generating a provisioning description, and traversing the provisioning description to identifying types and quantities of resources to he acquired.

10. The article of manufacture of claim 8, wherein coordinating the execution of each of the resource allocation protocols in the selected set of one or more resource allocation protocols to determine an optimal allocation of resources of the given resource type comprises identifying and executing at least one resource acquisition protocol that meets or exceeds specified performance criteria.

11. The article of manufacture of claim 10, wherein the specified performance criteria comprise a time requirement associated with execution of a given resource allocation protocol and a cost of communication associated with the execution of the given resource allocation protocol.

12. The article of manufacture of claim 10, wherein identifying and executing at least one resource acquisition protocol that meets or exceeds specified performance criteria comprises obtaining historical performance information associated with the at east one resource acquisition protocol from a database containing historic information.

13. The article of manufacture of claim 8, wherein coordinating the execution of each of the resource allocation protocols in the selected set of one or more resource allocation protocols to determine an optimal allocation of resources of the given resource type comprises evaluating a performance of at least one of the selected resource acquisition protocols to determine if the performance of the at least one selected resource acquisition protocol meets or exceeds specified performance criteria.

14. The article of manufacture of claim 13, wherein the performance is evaluated based on at least one of a protocol execution time, a resource cost, a number of messages exchanged, and a total size of exchanged data.

15. An apparatus, comprising:

a memory to store program instructions; and at least one processor device configured to execute the program instructions stored in the memory to execute method steps comprising:

deploying a service management platform on one or more computing nodes of a computer network, which is configured to acquire computing resources that are used for provisioning services;

receiving, by the service management platform, an electronic document from a service client, wherein the electronic document specifies a set of resources of different resource types for provisioning a requested service;

servicing said received service client request by the service management platform to acquire the set of resources of different resource types for provisioning the requested service, wherein servicing said received service client request comprises performing an automated process which comprises:

automatically processing the electronic document to identify the set of resources of different resource types for provisioning the requested service in the electronic document;

automatically determining a plurality of resource managers offering resources corresponding to the different resource types to he utilized for provisioning the service requested in the electronic document;

wherein the plurality of resource managers are distributed and heterogeneous;

for each given resource type of the different resource types identified, automatically determining an optimal resource allocation protocol to be used for acquiring resources of said given resource type from the plurality of resource managers, wherein automatically determining the optical resource allocation protocol comprises:

automatically selecting a set of one or more resource allocation protocols for communicating with the plurality of resource managers to allocate resources of the given resource type provided by the plurality of resource managers, wherein automatically selecting is based on respective performances of the one or more resource allocation protocols for the given resource type; and coordinating execution of each of the resource allocation protocols in the selected set of one or more resource allocation protocols to determine an optimal allocation of resources of the given resource type provided by the plurality of resource managers for provisioning the service;

wherein at least one of the resource allocation protocols utilizes a different type of resource acquisition methodology from at least another of the resource allocation protocols, and utilizing the resource allocation protocol in the selected set of one or more resource allocation protocols, which is determined to provide the optimal allocation of resources of said given resource type, to acquire resources of said given resource type from the plurality of resource managers.

16. The apparatus of claim 15, wherein coordinating the execution of each of the resource allocation protocols in the selected set of one or more resource allocation protocols to determine an optimal allocation of resources of the given resource type comprises identifying and executing at least one resource acquisition protocol that meets or exceeds specified performance criteria.

17. The apparatus of claim 16, wherein the specified performance criteria comprise a time requirement associated with execution of a given resource allocation protocol and a cost of communication associated with the execution of the given resource allocation protocol.

18. The apparatus of claim 16, wherein automatically processing the electronic document comprises automatically generating a provisioning description, and traversing the provisioning description to identifying types and quantities of resources to be acquired.

19. The apparatus of claim 16, wherein coordinating the execution of each of the resource allocation protocols in the selected set of one or more resource allocation protocols to determine an optimal allocation of resources of the given resource type comprises evaluating a performance of at least one of the selected resource acquisition protocols to determine if the performance of the at least one selected resource acquisition protocol meets or exceeds specified performance criteria.

20. The apparatus of claim 19, wherein the performance is evaluated based on at least one of a protocol execution time, a resource cost, a number of messages exchanged, and a total size of exchanged data.

* * * * *